US010194090B2

(12) United States Patent
Matsuno (10) Patent No.: US 10,194,090 B2
(45) Date of Patent: Jan. 29, 2019

(54) VIEW ANGLE CONTROL APPARATUS AND VIEW ANGLE CONTROL METHOD

(71) Applicant: CANON KABUSHIKI KAISHA, Tokyo (JP)

(72) Inventor: Keisuke Matsuno, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/496,619

(22) Filed: Apr. 25, 2017

(65) Prior Publication Data
US 2017/0318231 A1    Nov. 2, 2017

(30) Foreign Application Priority Data

Apr. 28, 2016   (JP) .................................. 2016-091586

(51) Int. Cl.
H04N 5/232   (2006.01)
H04N 5/225   (2006.01)
G02B 15/15   (2006.01)

(52) U.S. Cl.
CPC ..... *H04N 5/23296* (2013.01); *H04N 5/23258* (2013.01); *H04N 5/23287* (2013.01)

(58) Field of Classification Search
CPC ........... H04N 5/23296; H04N 5/23258; H04N 5/23287; H04N 5/23299; H04N 5/23216; H04N 5/2259; H04N 5/23238; G02B 15/15
USPC ....... 348/240.99, 240.1, 240.2, 240.3, 208.6, 348/211.9, 347, 369, 143; 396/85, 379
See application file for complete search history.

(56) References Cited

U.S. PATENT DOCUMENTS

| 10,044,943 | B2* | 8/2018 | Saito | ..................... H04N 5/2628 |
| 2001/0028395 | A1* | 10/2001 | Kawai | ..................... H04N 5/232 |
| | | | | 348/211.99 |
| 2011/0013662 | A1* | 1/2011 | Missalla et al. | ........ H04N 5/262 |
| | | | | 348/240.2 |
| 2011/0216225 | A1* | 9/2011 | Yoshizumi | ............. H04N 5/228 |
| | | | | 348/240.3 |
| 2011/0267503 | A1* | 11/2011 | Kunishige | .............. H04N 5/232 |
| | | | | 348/240.1 |

(Continued)

FOREIGN PATENT DOCUMENTS

JP    2015-102853 A    6/2015

*Primary Examiner* — Marly S Camargo
(74) *Attorney, Agent, or Firm* — Canon U.S.A., Inc. IP Division (57) ABSTRACT

A view angle control apparatus includes: a view angle change unit to change the view angle of an image; a control unit to perform first control where the view angle change unit changes the view angle from a first view angle to a second view angle that is by a predetermined amount to a wide-angle direction relative to the first view angle, according to a first determination, and perform second control where the view angle change unit changes the view angle to the first view angle, according to a second determination, after the first control; and an operating member to accept an operation of changing a setting of the predetermined amount, and upon an operation having been performed through the operating member between start of the first control and start of the second control, the control unit performs the second control after changing the setting of the predetermined amount.

20 Claims, 4 Drawing Sheets (56) References Cited

U.S. PATENT DOCUMENTS

2013/0120617 A1\* 5/2013 Kim .................. H04N 5/23293
 348/240.2
2015/0146011 A1 5/2015 Tsubusaki \* cited by examiner

VIEW ANGLE CONTROL APPARATUS AND VIEW ANGLE CONTROL METHOD

BACKGROUND

Field of Art

The present disclosure relates to a view angle control apparatus having a zoom function and a view angle control method.

Description of the Related Art

In recent years, magnification has been increased in an imaging apparatus such as a digital camera including an optical zoom that drives a zoom lens and an electronic zoom that enlarges a part of a captured image. When a user who is unaccustomed to shooting shoots in a telephoto state with such a high magnification model, it is difficult to capture a subject within the angle of view due to camera shake or the movement of the subject. Moreover, the captured subject is likely to go out of the frame soon. In such a case, if the imaging apparatus is caused to zoom out once with a zoom operation in an attempt to find the subject, camera shake at the time of the zoom operation, and the like make it difficult to stabilize the angle of view. Moreover, when the subject is captured and the imaging apparatus zooms in again, it takes time to return to the previous angle of view due to the zoom operation. The subject may go out of the frame again in the meantime.

Considering such problems, a function has been proposed which supports an operation to recapture a subject that has gone out of the frame within the angle of view. Japanese Patent Laid-Open No. 2015-102853 discloses a framing assist zoom function (FA zoom function) that assists a user in framing. Moreover, it is disclosed that in the FA zoom function, if the amount of movement of an imaging apparatus is large, the imaging apparatus judges that a user is searching for the subject and the imaging apparatus zooms out automatically, and if the amount of movement of the imaging apparatus subsequently decreases, the imaging apparatus judges that the subject has been captured again, and the imaging apparatus zooms in automatically.

In the above control disclosed in Japanese Patent Laid-Open No. 2015-102853, the zoom-out amount for the automatic zoom out is required to be preset on a settings menu of a display unit. Hence, if the zoomed out angle of view is not suitable to search for the subject, it is required to go to the settings menu once and set the zoom-out amount again; accordingly, there is a problem that shooting is interrupted.

SUMMARY

The disclosure of the present application makes it possible to make an adjustment to an angle of view desired by a user and search for a subject in a zoom operation for capturing the subject within the angle of view, without interrupting shooting.

A view angle control apparatus includes: a view angle change unit configured to change the angle of view of an image; a control unit configured to perform first control where the view angle change unit changes the angle of view from a first angle of view to a second angle of view that is by a predetermined amount in a wide-angle direction with respect to the first angle of view, in accordance with a first determination, and perform second control where the view angle change unit changes the angle of view to the first angle of view, in accordance with a second determination, after the first control; and an operating member configured to accept an operation of changing a setting related to the predetermined amount, and upon an operation having been performed through the operating member between start of the first control and start of the second control, the control unit performs the second control after changing the setting related to the predetermined amount in response to the operation.

Further features will become apparent from the following description of exemplary embodiments (with reference to the attached drawings).

DESCRIPTION OF THE EMBODIMENTS

Exemplary embodiments of the present disclosure are described in detail hereinafter with reference to the accompanied drawings. A function to be achieved by the exemplary embodiments is a framing assist zoom function that assists a user in framing, and is referred to as a framing assist zoom function (hereinafter, the FA zoom function) for convenience sake.

First Exemplary Embodiment

Figure 1:
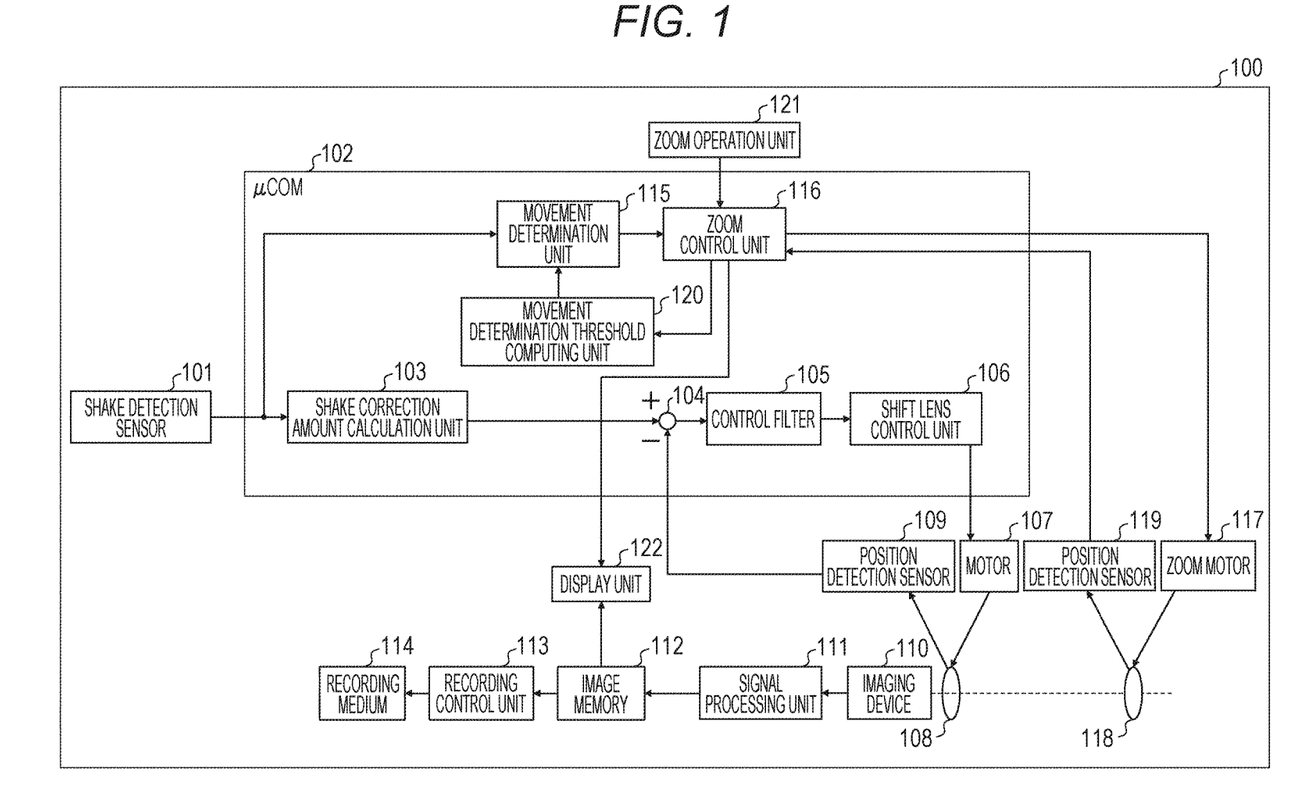
FIG. 1 is a block diagram illustrating an example of the configuration of an imaging apparatus as an example of a view angle control apparatus according to the exemplary embodiment.

FIG. 1 is a block diagram illustrating an example of the configuration of an imaging apparatus 100 as an example of a view angle control apparatus having the FA zoom function according to the exemplary embodiment. The imaging apparatus 100 is any electronic device having a shooting function such as a digital video camera. Configuration units of the imaging apparatus 100 and examples of their operations are specifically described below.

The imaging apparatus 100 of the exemplary embodiment has an image stabilization function.

Information on the shake of the imaging apparatus 100 detected for image stabilization is used to calculate the amount of movement of the imaging apparatus 100 for an FA zoom described below. A movement amount detection sensor dedicated for the FA zoom may be provided separately. When the FA zoom function is achieved, the provision of the image stabilization function is not always required.

A shake detection sensor 101 detects shake on the imaging apparatus 100. Examples of the shake detection sensor 101 include an angular velocity sensor that detects the shake of the imaging apparatus 100 as angular velocity. A microcomputer 102 (μCOM 102) performs signal processing on an output of the shake detection sensor 101. The μCOM 102 includes function blocks of a shake correction amount calculation unit 103, a subtractor 104, a control filter 105, a shift lens control unit 106, a movement determination unit 115, a zoom control unit 116, and a movement determination threshold computing unit 120.

The shake correction amount calculation unit 103 calculates a shake correction amount on the basis of the output of the shake detection sensor 101. The shake correction amount is a value indicating an amount to drive an image stabilizing mechanism 108 to counteract the blur of a captured image. Specifically, the shake correction amount calculation unit 103 includes an integrator, and converts an angular velocity signal output by the shake detection sensor 101 into an angle signal and outputs the angle signal.

The subtractor 104 outputs, to the control filter 105, deviation data obtained by subtracting position data of the image stabilizing mechanism 108 from the output of the shake correction amount calculation unit 103. The control filter 105 performs signal processing with an amplifier and a phase compensation filter on the deviation data supplied from the subtractor 104. The deviation data is then output to the shift lens control unit 106.

The shift lens control unit 106 modulates the amount of motor control for driving the image stabilizing mechanism 108 to a waveform that changes the duty cycle of a pulse wave (that is, a PWM waveform) to control the drive of a motor 107. The motor 107 is, for example, a voice coil motor. The motor 107 is driven to move the image stabilizing mechanism 108 in a direction different from an optical axis. The image stabilizing mechanism 108 is, as an example, a lens unit that can move in the direction different from the optical axis. FIG. 1 illustrates the image stabilizing mechanism 108 and an imaging device 110 separately. However, the image stabilizing mechanism 108 may be configured including a structure where the imaging device 110 is on a movable unit to be movable in the direction different from the optical axis.

A position detection sensor 109 is configured including a magnet and a Hall sensor provided at a position facing the magnet. The position detection sensor 109 detects the travel distance of the image stabilizing mechanism 108 in a direction vertical to the optical axis, and supplies it to the above-mentioned subtractor 104. Consequently, a feedback control system is configured which causes the travel distance of the image stabilizing mechanism 108 in the direction different from the optical axis to follow the output of the shake correction amount calculation unit 103. As a result of the travel of the image stabilizing mechanism 108 on the basis of the shake correction amount, an image where vertical or horizontal blur of a subject on the image plane occurred by the shake of the imaging apparatus 100 has been corrected is formed on the imaging device 110.

The imaging device 110 converts the subject image formed by a shooting optical system including the image stabilizing mechanism 108 into an electrical signal, and outputs the electrical signal to a signal processing unit 111. The signal processing unit 111 generates a video signal (image signal) pursuant to, for example, the NTSC format from the signal output from the imaging device 110, and supplies the video signal to an image memory 112.

The video signal output from the image memory 112 is output to a recording control unit 113. If an operating unit (not illustrated) used to instruct the start and end of recording has instructed to record the video signal, the recording control unit 113 outputs the video signal supplied from the image memory 112 to a recording medium 114 for recording. The recording medium 114 is, for example, an information recording medium such as a semiconductor memory or a magnetic recording medium such as a hard disk. Moreover, a display unit 122 is configured including a TFT LCD (thin film transistor-driven liquid crystal display device), and displays an image based on the video signal supplied from the image memory 112, shooting information, and the like. With display of such a live view image, an electronic viewfinder (EVF) function is achieved which allows a user to adjust the angle of view.

Next, a configuration related to the FA zoom function is described. The output of the shake detection sensor 101 which may act as an acquisition unit is also supplied to the movement determination unit 115. The movement determination unit 115 determines on the basis of the amount of movement of the imaging apparatus 100 detected by the shake detection sensor 101 whether or not the user is acting as if he/she is searching for the subject (for example, panning). When the user has lost sight of the subject, it is assumed to move the imaging apparatus 100 largely to search for the subject. The movement determination unit 115 determines on the basis of this idea that the user is searching for the subject when the amount of movement of the imaging apparatus 100 is equal to or greater than a first threshold. Conversely, when the subject is being stably captured, the amount of movement of the imaging apparatus 100 is small.

Accordingly, the movement determination unit 115 determines that the user is capturing the subject when the amount of movement is less than a second threshold. The amount of movement is a value based on any of at least the angular velocity, acceleration, and the angle that is calculated by the movement determination unit by integrating the angular velocity. Moreover, the threshold to determine the amount of movement uses the threshold calculated by the movement determination threshold computing unit 120 described below. An acquisition unit may include instructions executed by one or more processors for determining if the imaging apparatus 100 has moved. The acquisition unit may also include the one or more processors. The acquisition unit may include the shake detection sensor 101.

The zoom control unit 116 provides a driving signal of zoom out or zoom in to a zoom motor 117 on the basis of the determination result of the movement determination unit 115 to control the change of the angle of view. The zoom motor 117 is, for example, a stepping motor. The stepping motor is rotated to rotate a feed screw. A zoom lens 118 is moved in the optical axis direction. The zoom control unit 116 calculates a driving signal with a necessary number of pulses to move the zoom lens 118 to a target position to input it to the zoom motor 117. A view angle change unit may a set of instructions executed by one or more processors for determining the driving signal of zoom out or zoom in. The view angle change unit may also include the one or more processors. The view angle change unit may include one or more circuits for providing the driving signal to the zoom motor 117. The view angle change unit may include the zoom motor 117. The view angle change unit may include a feed screw driven by the zoom motor 117.

A position scale (not illustrated) for detecting the position of the zoom lens 118 is fixed to a holding frame of the zoom lens. A position detection sensor 119 is fixed at a point facing the position scale of a lens barrel portion (not illustrated). A scale pattern such as a magnetic pattern or light reflection pattern is formed in the optical axis direction on the position scale. It is configured such that the position detection sensor 119 reads a magnetic signal, a light reflection signal, or the like in accordance with the position of the scale to enable the detection of the position of the zoom lens 118 in the optical axis direction. A detection signal of the position detection sensor 119 is input into the zoom control unit 116 to be used to control the position of the zoom lens 118.

The movement determination threshold computing unit 120 calculates a zoom-out movement determination threshold (first threshold) and a zoom-in movement determination threshold (second threshold) on the basis of the current zoom position information obtained by the zoom control unit 116. The zoom-out movement determination threshold indicates a value of the amount of movement greater than the zoom-in movement determination threshold. Even if the amount of movement of the imaging apparatus 100 is constant, it is more likely to lose sight of a subject when the zoom position is in a telephoto direction than when in a wide-angle direction. Accordingly, it is desirable that even a smaller amount of movement tend to be determined to be searching for the subject in the case of the telephoto direction. Hence, the determination threshold is decided on the basis of the zoom position in such a manner as to be more likely to zoom out when, for example, the zoom position is in the telephoto direction than when in the wide-angle direction. As an example, the zoom-out movement determination threshold of when the zoom position is in the telephoto direction with respect to a predetermined position may be set to be smaller than the zoom-out movement determination threshold of when the zoom position is in the wide-angle direction with respect to the predetermined position.

The FA zoom function of the exemplary embodiment may be applied to not only an optical zoom that optically changes the focal length with the travel of the zoom lens 118 but also an electronic zoom that cuts out and enlarges a part of an area from an image signal output to the image memory 112 for electronic magnification. In the case of a combined use of the optical zoom and the electronic zoom, the electronic zoom may be used when it is instructed to zoom in further from a telephoto end of the optical zoom.

Figure 2:
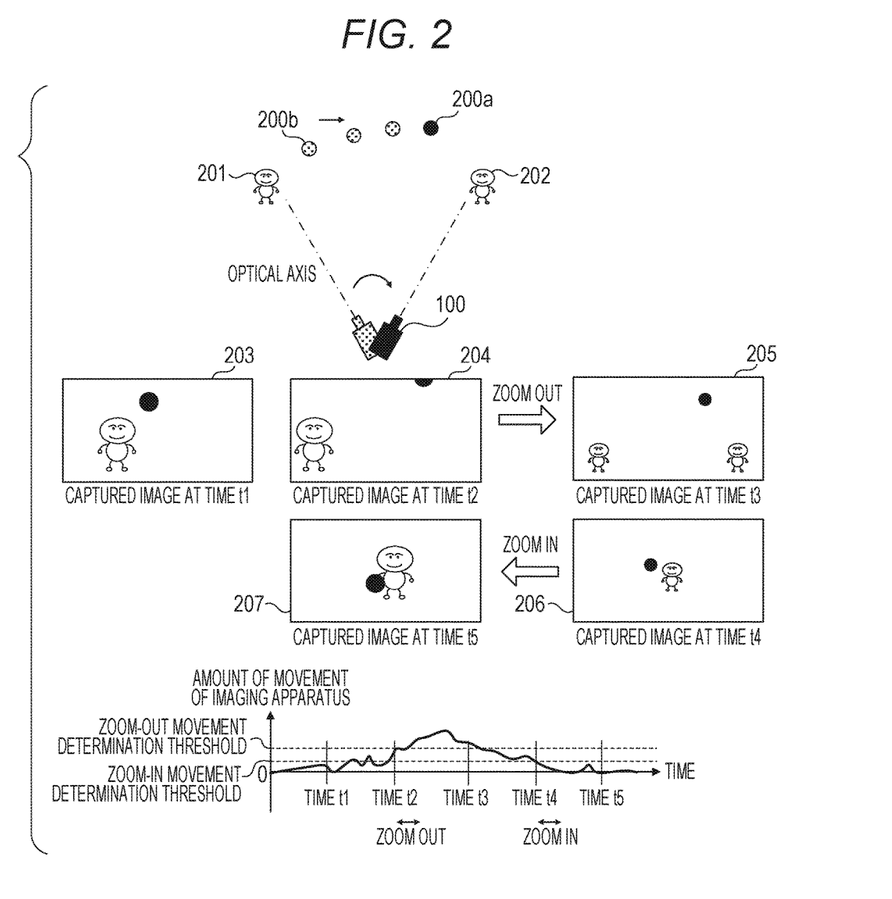
FIG. 2 is a diagram describing a specific example of control over the angle of view using an FA zoom function.

Next, a specific example of control over the angle of view using the FA zoom function is described with reference to FIG. 2. FIG. 2 illustrates images that are captured when the imaging apparatus 100 is moved from left to right in FIG. 2 in an attempt to capture a ball 200a being a moving subject, and the amount of movement of the imaging apparatus 100. A positional relationships between the ball 200a being the moving subject, persons 201 and 202 being stationary subjects, and the imaging apparatus 100 is illustrated in the upper part of FIG. 2. Assume that the black-filled ball 200a indicates the ball at the present moment (at that point in time), and shaded balls indicate the ball in the past. The ball at time t1 is indicated by, for example, a shaded ball 200b. Moreover, below them are captured images (203 to 207) captured by the imaging apparatus 100 at each time. Furthermore, a graph of a relationship between time and the movement of the imaging apparatus 100 (movement from left to right in FIG. 2) is illustrated below the captured images. Until time t1, the imaging apparatus 100 hardly moves. Its amount of movement is a small value. When the ball 200a is thrown at time t1, a user moves the imaging apparatus 100 in an attempt to capture it. Accordingly, the output of the shake detection sensor 101 starts increasing.

When the captured image 203 captured at time t1 and the captured image 204 captured at time t2 are viewed, it can be seen that the ball 200a changes its position from near the center of the frame to an end of the frame. At time t2, the user continues moving the imaging apparatus in an attempt to avoid the ball from moving out of the frame. Accordingly, the amount of movement is further increased. At time t2, the amount of movement becomes a value equal to or greater than the zoom-out movement determination threshold calculated by the movement determination threshold computing unit 120. The movement determination unit 115 determines that the subject is being searched for. The zoom control unit 116 starts automatic zoom out. Consequently, at time t3 later than time t2, the shooting angle becomes a wide angle to make it easier to capture the subject (refer to the captured image 204 captured at time t2 and the captured image 205 captured at time t3).

The amount (predetermined amount) of operation of the automatic zoom out by the zoom control unit 116 can be changed by menu settings of the imaging apparatus 100. Moreover, the amount of operation may be a value corresponding to a zoom magnification, or a value corresponding to, for example, the number of driving pulses of the zoom motor 117. As an example of the menu settings of the amount of operation, the amount of operation may be selected from three levels of large, middle, and small, and each of the zoom magnifications may be set to, for example, ⅙, ¼, and ½. As another example, it may be configured such that any parameter corresponding to the amount of operation can be input or selected. Moreover, if the controllable range of the zoom control unit 116 reaches its limit, the automatic zoom out is stopped irrespective of the menu settings.

The ball 200a being the subject is then captured within the shooting angle. The movement of the imaging apparatus 100 decreases; accordingly, the amount of movement decreases. At time t4, the amount of movement becomes a value less than the zoom-in movement determination threshold calculated by the movement determination threshold computing unit 120. The movement determination unit 115 determines that the subject is being captured. The zoom control unit 116 performs the automatic zoom in. Consequently, at time t5 later than time t4, the shooting angle becomes telephoto, and accordingly, it is possible to shoot the subject at an appropriate size (refer to the captured image 206 captured at time t4 and the captured image 207 captured at time t5). At this point in time, the amount of the automatic zoom-in operation by the zoom control unit 116 is set to the amount of zoom-in operation equivalent to the amount of the previous automatic zoom out. As a result, the angle of view can be returned to one equal to the angle of view used for shooting at time t1. Consequently, a series of processes of control over the FA zoom function (FA zoom control) is complete.

Moreover, the imaging apparatus 100 is further provided with a zoom operation unit 121. The zoom operation unit 121 accepts an operation on the imaging apparatus 100 to make any zoom operation of the user possible. When the zoom operation unit 121 is operated during the FA zoom control, the control process varies depending on the state during the FA zoom. A process during the FA zoom control is described below.

A state where the FA zoom function is enabled and a normal shooting state where even if the amount of movement is large, the automatic zoom out is not performed can be switched by an unillustrated operating member such as an FA zoom ON/OFF button, the menu settings of the imaging apparatus 100, and the like any of which may act as an operating member for accepting an instruction. Other input mechanisms including but not limited to operating members that are part of the imaging apparatus 100 or in communication with the imaging apparatus 100 may act as the operating member for accepting an instruction.

The imaging apparatus 100 is not necessarily configured of one mechanism. The exemplary embodiment also includes, for example, a configuration where the imaging apparatus 100 is an interchangeable-lens camera, and includes the image stabilizing mechanism 108, the zoom lens 118, the motors to drive them, and the position detection sensors in the interchangeable lens.

Next, a FA zoom control process to be executed in the state where the FA zoom function is enabled is described in detail with reference to a flowchart of FIG. 3.

In step S300, the COM 102 (the movement determination unit 115) determines whether or not the amount of movement of the imaging apparatus 100 is equal to or greater than the zoom-out movement determination threshold and, when the amount of movement has become equal to or greater than the zoom-out movement determination threshold, advances the processing to step S301. In step S301, the μCOM 102 (the zoom control unit) acquires information on the current focal length on the basis of a detection signal of the position detection sensor 119, and advances the processing to step S302. When the electronic zoom is used, the current zoom magnification may be converted into a focal length of the optical zoom to handle it as the current focal length information.

In step S302, the COM 102 (the zoom control unit) transmits a driving signal to the zoom motor 117 to move the zoom lens 118 in the wide-angle direction, and starts the automatic zoom out. When the electronic zoom is used, zoom out may be performed first in an electronic zoom area. In step S303, the COM 102 (the zoom control unit) determines whether or not the user has operated the zoom operation unit 121. If the zoom operation unit 121 has been operated, the processing proceeds to step S305. If the zoom operation unit 121 has not been operated, the processing proceeds to step S304.

In step S305, the COM 102 (the zoom control unit) stops the automatic zoom out started in step S302, and advances the processing to step S308. In this manner, in the exemplary embodiment, if the zoom operation unit 121 has been operated during the automatic zoom out after the determination that the amount of movement of the imaging apparatus 100 became equal to or greater than the zoom-out movement determination threshold, the automatic zoom out is stopped.

On the other hand, in step S304, the μCOM 102 (the zoom control unit) determines whether or not an actual amount of zoom-out operation has reached a preset amount of zoom operation. If the actual amount of zoom-out operation has not reached the set amount of zoom operation, the processing returns to step S303 to continue the determination. If the actual amount of zoom-out operation has reached the set amount of zoom operation, the processing proceeds to step S306 to stop the automatic zoom out.

In step S307, the μCOM 102 (the zoom control unit) determines whether or not the user has operated the zoom operation unit 121 as in step S303. If the zoom operation unit 121 has been operated, the processing proceeds to step S308. If the zoom operation unit 121 has not been operated, the processing proceeds to step S313.

If it is determined in step S303 or S307 that the zoom operation unit 121 has been operated, the processing proceeds to step S308. In step S308, the COM 102 (the zoom control unit) transmits a driving signal to the zoom motor 117 to perform the zoom operation in response to the user's operation through the zoom operation unit 121. The operation here may be zoom out or zoom in, or an operation where both are mixed. Moreover, the electronic zoom may also be used here. In step S309, the μCOM 102 (the zoom control unit) determines whether or not the operation of the zoom operation unit 121 is complete. If the operation of the zoom operation unit 121 is not complete, the zoom operation in step S308 is continued. When the operation of the zoom operation unit 121 is complete, the processing proceeds to step S310.

In step S310, the COM 102 (the zoom control unit) acquires information on the current focal length on the basis of a detection signal of the position detection sensor 119 as in step S301, and advances the processing to step S311. In step S311, the μCOM 102 (the zoom control unit) calculates a relative zoom magnification with reference to the focal length before the start of the automatic zoom out, which was acquired in step S301. The processing proceeds to step S312. In step S312, the COM 102 (the zoom control unit) updates a value of the preset amount of zoom operation at the time of the FA zoom control on the basis of the zoom magnification calculated in step S311. The zoom magnification is obtained here from the change in focal length. However, these values may be different parameters related to the amount of zoom operation, or the focal length information acquired in step S311 may be set as a target focal length of the automatic zoom out. Moreover, the user may be notified of the change in the setting of the amount of zoom operation in the FA zoom control. The notification method may be to notify by a lighting state of an LED or the like, which is displayed on the display unit 122, to emit a sound, or the like, and is not limited to a specific notification method.

In this manner, in the exemplary embodiment, while the automatic zoom out is being performed in accordance with the movement of the imaging apparatus 100, or in a state where the automatic zoom out equivalent to the set amount of zoom operation has been finished and a wide angle of view is being held, the operation for changing the setting of the amount of zoom operation is accepted. In other words, the operation for changing the setting of the amount of zoom operation is accepted between the start of the automatic zoom out and the start of automatic zoom in described below. The amount of zoom operation changed here is held even after the automatic zoom in, and is reflected in the next and subsequent automatic zoom out. If the operation is performed during the automatic zoom out, the automatic zoom out is stopped as described above. The changed amount of zoom operation may be reflected in the amount of operation selected by the menu settings. Moreover, the changed amount of zoom operation may be held until being changed again, or may be reset in response to the turning-off of the power to the imaging apparatus 100, the cancellation of the FA zoom function, the passage of a predetermined period of time, or the like.

If the setting of the amount of zoom operation was changed in step S312, or if the zoom operation unit 121 was not operated in step S307, the processing proceeds to step S313. In step S313, the μCOM 102 (the movement determination unit 115) determines whether or not the amount of movement of the imaging apparatus 100 is smaller than the zoom-in movement determination threshold. If the amount of movement is equal to or greater than the zoom-out movement determination threshold, the processing returns to step S307 to monitor the operation of the zoom operation unit 121. When the amount of movement becomes smaller than the zoom-out movement determination threshold, the processing proceeds to step S314.

In step S314, the μCOM 102 (the zoom control unit) transmits a driving signal to the zoom motor 117 to move the zoom lens 118 in the telephoto direction, and starts the automatic zoom in. To zoom in further from the telephoto end of the optical zoom, zoom in may be performed up to the electronic zoom area.

In step S315, the μCOM 102 (the zoom control unit) determines whether or not the actual amount of zoom-in operation has reached the set amount of zoom operation. The amount of zoom operation here is the amount of zoom operation for returning to the angle of view before the start of the automatic zoom out in step S302. In other words, it is the amount of operation for zoom in equivalent to the amount of zoom operation at the time of the above-mentioned automatic zoom out. However, when the setting of the amount of zoom operation was changed in step S312, the changed setting of the amount of zoom operation is applied. If the amount of operation has not reached the set amount of zoom operation, the processing proceeds to step S316. When the amount of operation has reached the set amount of zoom operation, the processing proceeds to step S317 to stop the automatic zoom in. The FA zoom control is then terminated.

In step S316, the COM 102 (the zoom control unit) determines whether or not the user has performed the zoom operation unit 121 as in step S303. If the zoom operation unit 121 has been operated, the processing proceeds to step S318. If the zoom operation unit 121 has not been operated, the processing returns to step S315 to continue the determination.

In step S318, the μCOM 102 (the zoom control unit) stops the automatic zoom in, and advances the processing to step S319. In step S319, the μCOM 102 (the zoom control unit) transmits a driving signal to the zoom motor 117 to perform the zoom operation in response to the user's operation through the zoom operation unit 121 as in step S308. In step S320, the μCOM 102 (the zoom control unit) determines whether or not the operation of the zoom operation unit 121 is complete as in step S309. If the operation of the zoom operation unit 121 is not complete, the zoom operation of step S319 is continued. If the operation of the zoom operation unit 121 is complete, the FA zoom control is terminated.

A predetermined waiting time may be provided between when the operation of the zoom operation unit 121 is complete in step S309 and when the determination is made in step S313. Such a waiting time is provided to enable the prevention of the occurrence of an unnatural operation resulting from the automatic zoom in being performed immediately after the completion of the user's operation of the zoom operation unit 121.

With the above processing, the amount of zoom operation for efficiently searching for a missed subject can be set while the user is looking at the subject in an image. Moreover, an equivalent amount of zoom operation can also be applied when the user has lost sight of the subject again. Accordingly, it becomes possible to efficiently search for the missed subject. According to the exemplary embodiment, in this manner, it becomes possible to make an adjustment to an angle of view desired by a user and enable a search for a subject without interrupting shooting.

In the exemplary embodiment, the start condition of the automatic zoom out and the automatic zoom in for the FA zoom is determined on the basis of the amount of movement of the imaging apparatus 100. However, a judgment may be based on another determination criterion. For example, zoom out and zoom in may be started in response to a predetermined operation of the user. As the predetermined operation of the user, the operation of the zoom operation unit 121 may serve as a condition. In this case, if the operation time of the zoom operation unit 121 is less than a predetermined time, it serves as the start condition of the automatic zoom in. If the operation time is equal to or greater than the predetermined time, the operation determined in step S303 or S307 is accepted. In this manner, the process to be executed may be changed according to the operation time. Moreover, the start condition of the automatic zoom in may be the passage of a predetermined time after the completion of the automatic zoom out.

Second Exemplary Embodiment

A second exemplary embodiment is different from the first exemplary embodiment in the respect that when the zoom position (angle of view) is changed by a user's operation during the automatic zoom out or in the state where a wide angle of view is being held after the end of the automatic zoom out, the process is changed according to the zoom position after the operation. An FA zoom control process of the exemplary embodiment is described with reference to a flowchart of FIG. 4. Descriptions of parts common to the first exemplary embodiment are omitted below.

Figure 3:
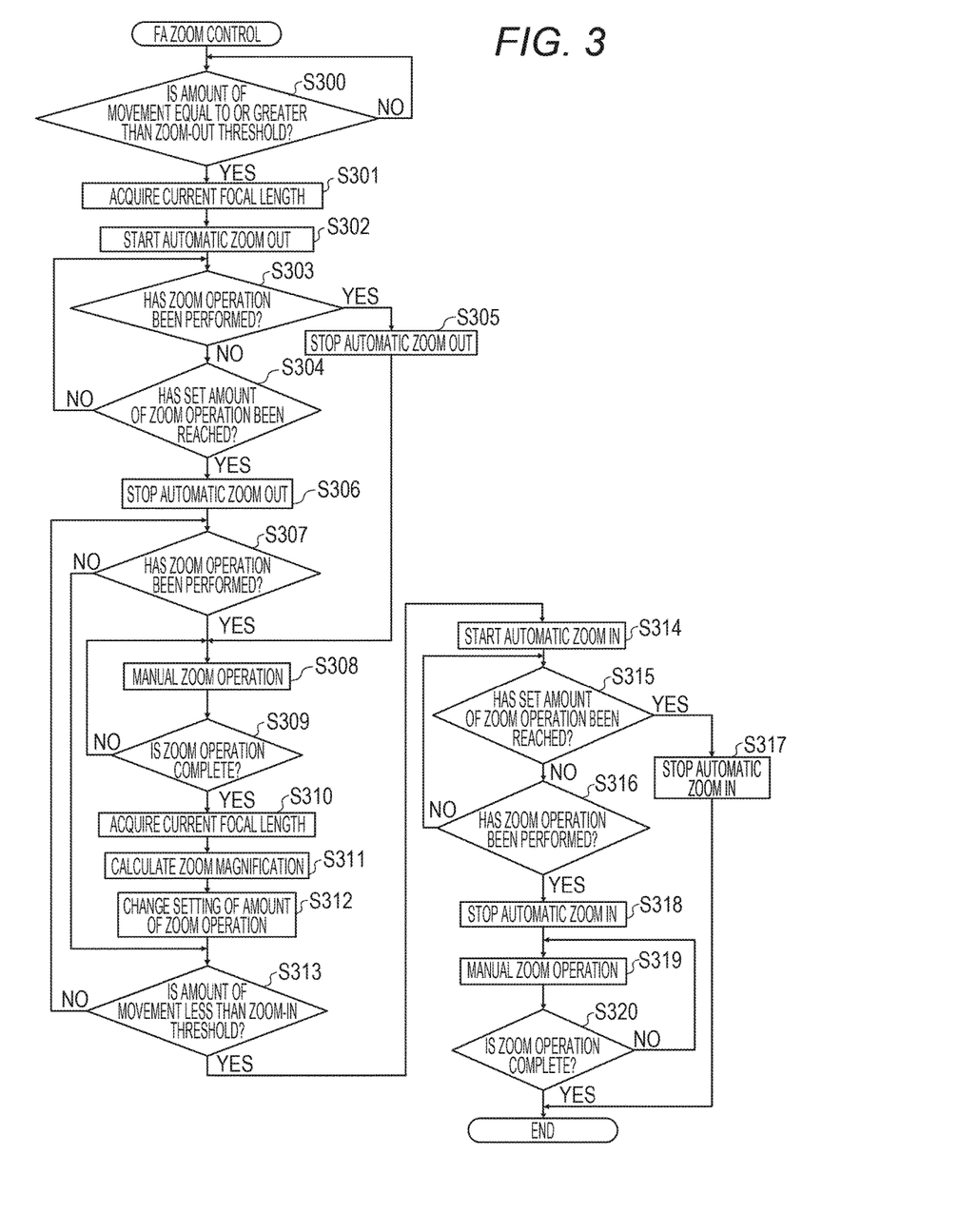
FIG. 3 is a flowchart illustrating an FA zoom control process in a first exemplary embodiment.
Figure 4:
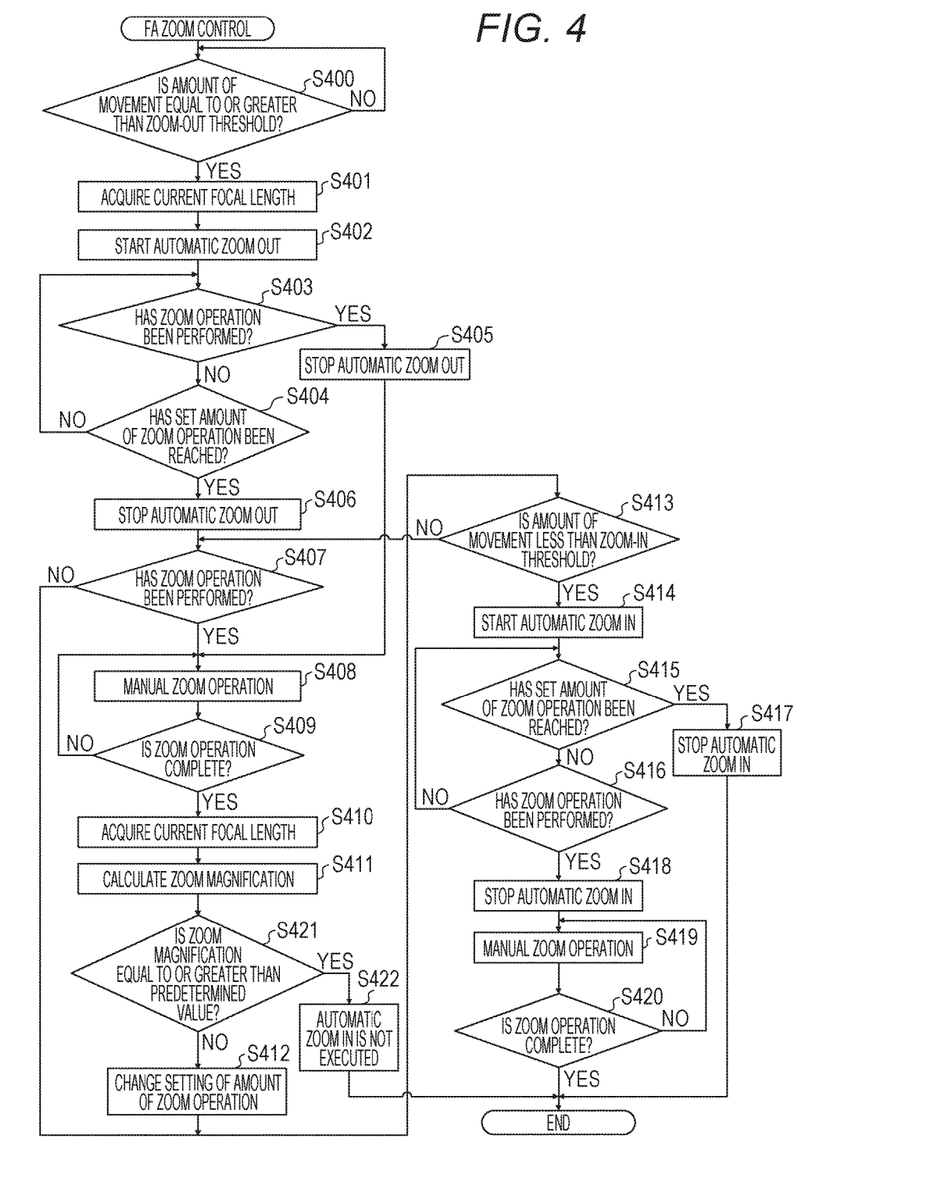
FIG. 4 is a flowchart illustrating an FA zoom control process in a second exemplary embodiment.

The processing of steps S400 to S411 is similar to that of steps S301 to S311 of FIG. 3 of the first exemplary embodiment. As in the first exemplary embodiment, the zoom magnification is calculated in step S411, the processing proceeds to step S421. In step S421, the μCOM 102 (the zoom control unit) determines whether or not the zoom magnification calculated in step S411 is equal to or greater than a predetermined value. If the zoom magnification is equal to or greater than the predetermined value, the processing proceeds to step S422. If the zoom magnification is smaller than the predetermined value, the processing proceeds to step S412. The processing in steps S412 to steps S420 are similar to the processing in steps S312 to S420 of FIG. 3.

Let the predetermined value be one at the maximum. This is because when the zoom magnification is greater than one, the current focal length is in the telephoto direction with respect to a focal length before the start of the automatic zoom out in step S402 and accordingly, cannot be handled as the amount of operation in the automatic zoom out. In such a situation, the angle of view at the point of the completion of the user's operation of the zoom operation unit 121 is highly likely to be a shooting angle desired by the user. Hence, in step S422, the μCOM 102 (the zoom control unit) terminates the FA zoom control without executing the automatic zoom in. In this case, the setting of the amount of zoom operation is not changed in step S412.

Also if the zoom magnification is smaller than one, when it is a value close to one, a difference in angle of view between before and after the automatic zoom out is small. The purpose of facilitating a search for a subject probably becomes impossible to be achieved. Hence, the predetermined value is desired to be set at an empirically or experimentally appropriate value to perform zoom out sufficiently to search for the subject.

With the above processing, it also becomes possible in the exemplary embodiment to make an adjustment to an angle of view desired by a user and enable a search for a subject, without interrupting shooting. Moreover, if the user has changed the angle of view during the automatic zoom out or in the state where a wide angle of view is being held after the end of the automatic zoom out, the amount of zoom operation is not updated in accordance with the changed angle of view in the exemplary embodiment. Consequently, it is possible to prevent the setting of the amount of zoom operation inappropriate to the purpose of the FA zoom that facilitates a search for a missed subject. A control unit may include one or more instructions for one or more processors to implement one or more of the steps described in FIGS. 3 and 4. The control unit may also include the one or more processors. The control unit may be a controller or the like and may function as other components in an embodiment.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-091586, filed Apr. 28, 2016, which is hereby incorporated by reference herein in its entirety.

What is claimed is:

1. A view angle control apparatus comprising:
a view angle change unit configured to change an angle of view of an image;
a control unit configured to perform a first control where the view angle change unit changes the angle of view from a first angle of view to a second angle of view that is by a predetermined amount in a wide-angle direction with respect to the first angle of view, in accordance with a first determination, and perform second control where the view angle change unit changes the angle of view to the first angle of view, in accordance with a second determination, after the first control; and
an operating member configured to accept an operation of changing a setting related to the predetermined amount, wherein
upon an operation having been performed through the operating member between start of the first control and start of the second control, the control unit performs the second control after changing the setting related to the predetermined amount in response to the operation.

2. The view angle control apparatus according to claim 1, wherein
the operating member accepts an operation of changing the angle of view of the image, and
upon an operation having been performed through the operating member between the start of the first control and the start of the second control, the control unit changes the setting related to the predetermined amount on the basis of a third angle of view after the change in response to the operation, and the first angle of view.

3. The view angle control apparatus according to claim 2, wherein upon an operation having been performed through the operating member between the start of the first control and the start of the second control, the control unit changes the setting related to the predetermined amount on the basis of a zoom magnification of the third angle of view with reference to the first angle of view.

4. The view angle control apparatus according to claim 3, wherein in a case where the zoom magnification of the third angle of view with reference to the first angle of view is equal to or greater than a predetermined value, the control unit does not change the setting related to the predetermined amount.

5. The view angle control apparatus according to claim 4, wherein in the case where the zoom magnification of the third angle of view with reference to the first angle of view is equal to or greater than the predetermined value, the control unit does not perform the second control.

6. The view angle control apparatus according to claim 4, wherein the case where the zoom magnification of the third angle of view is equal to or greater than the predetermined value includes a case where the third angle of view is in a telephoto direction with respect to the first angle of view.

7. The view angle control apparatus according to claim 1, wherein the control unit changes the setting related to the predetermined amount by changing a zoom magnification of the second angle of view determined in accordance with the first angle of view.

8. The view angle control apparatus according to claim 1, wherein the control unit changes the setting related to the predetermined amount by changing a focal length corresponding to the second angle of view.

9. The view angle control apparatus according to claim 1, wherein the changed setting related to the predetermined amount is maintained even after the second control.

10. The view angle control apparatus according to claim 1, wherein upon an operation having been performed through the operating member between the start and completion of the first control, the control unit stops the first control and changes the setting related to the predetermined amount in response to the operation.

11. The view angle control apparatus according to claim 1, further comprising an acquisition unit configured to acquire the amount of movement of the view angle control apparatus, wherein the control unit makes the first and second determinations on the basis of the amount of movement acquired by the acquisition unit.

12. The view angle control apparatus according to claim 11, wherein the control unit
performs the first control as the first determination upon the amount of movement acquired by the acquisition unit being equal to or greater than a first threshold, and
performs the second control as the second determination upon the amount of movement acquired by the acquisition unit being smaller than a second threshold.

13. The view angle control apparatus according to claim 1, wherein the control unit performs the second control as the second determination upon a first time having passed after the completion of the first control.

14. The view angle control apparatus according to claim 1, wherein the control unit makes the first and second determinations on the basis of a predetermined operation of a user.

15. The view angle control apparatus according to claim 14, wherein the predetermined operation is an operation of instructing to start each of the first control and the second control.

16. The view angle control apparatus according to claim 1, wherein upon an operation having been performed through the operating member between the start of the first control and the start of the second control, the control unit does not perform the second control until a second time passes after the operation.

17. The view angle control apparatus according to claim 1, wherein the view angle change unit optically changes the focal length to change the angle of view.

18. The view angle control apparatus according to claim 1, wherein the view angle change unit enlarges a part of an area of the image to electronically change the angle of view.

19. A view angle control apparatus comprising:
   a view angle change unit configured to change the angle of view of an image;
   an operating member configured to accept an operation of changing a setting of the angle of view; and
   a control unit configured to control the change of the angle of view by the view angle change unit, wherein
   the control unit performs first control of changing the angle of view from a first angle of view to a second angle of view that is by a preset amount to a wide-angle direction with respect to the first angle of view, in accordance with a first determination, performs second control of changing the angle of view to the first angle of view, in accordance with a second determination, after the first control, performs third control of changing the angle of view to a third angle of view determined in response to the operation upon an operation having been performed through the operating member between start of the first control and start of the second control, and performs the first control of changing the angle of view from the third angle of view to the first angle of view, in accordance with the second determination.

20. A view angle control method for controlling the angle of view of an image, the method comprising:
   performing first control of changing the angle of view from a first angle of view to a second angle of view that is by a predetermined amount to a wide-angle direction with respect to the first angle of view, in accordance with a first determination;
   performing second control of changing the angle of view to the first angle of view, in accordance with a second determination, after the first control;
   upon an operation of changing a setting related to the predetermined amount having been performed between start of the first control and start of the second control, changing the setting related to the predetermined amount in response to the operation; and
   upon the setting related to the predetermined amount having been changed, performing the second control after changing the setting related to the predetermined amount.

* * * * *